Figure 1:
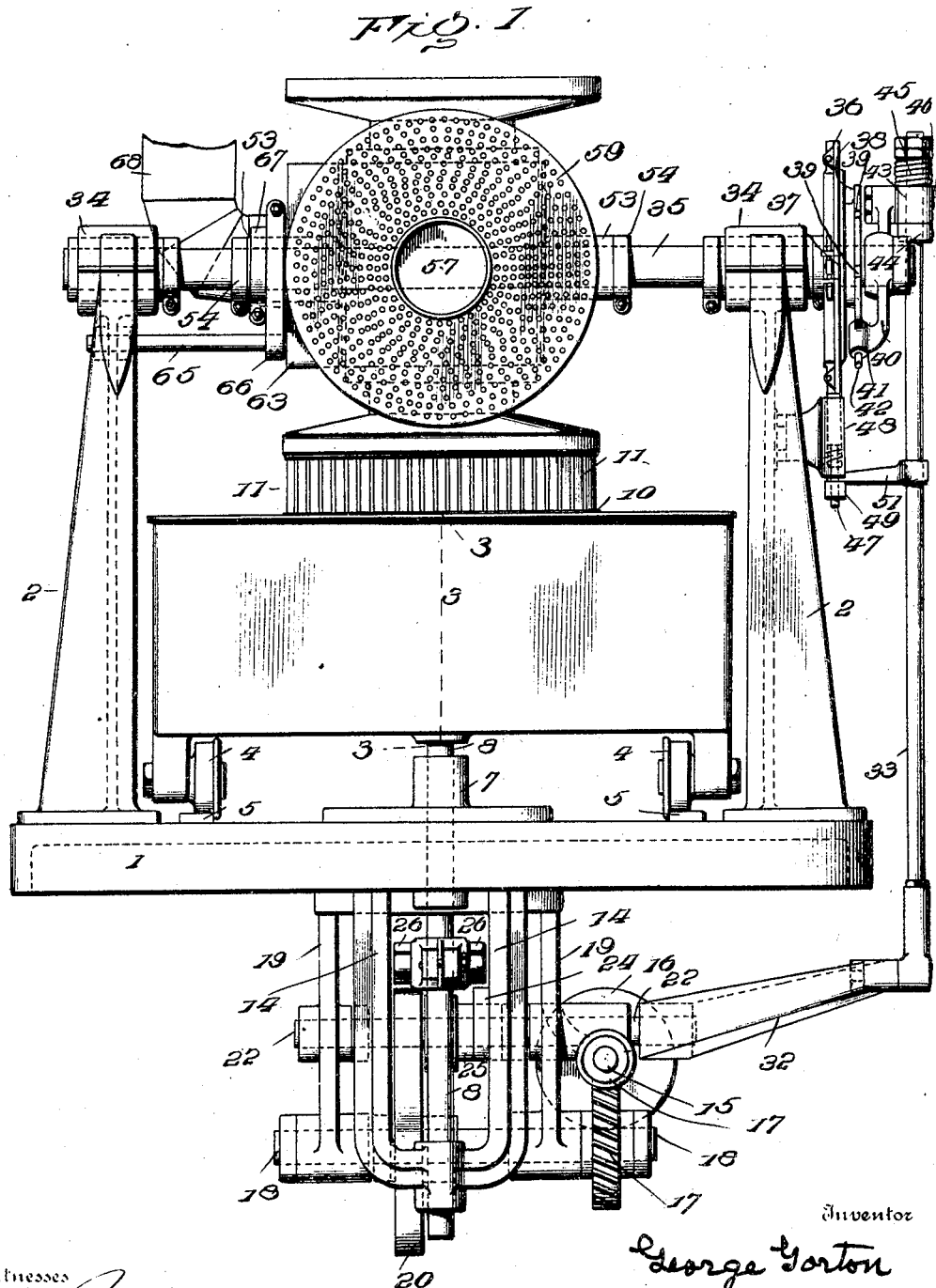

No. 794,174. PATENTED JULY 11, 1905.
G. GORTON.
MACHINE FOR MAKING ABRADING SURFACES.
APPLICATION FILED JAN. 28, 1903. RENEWED FEB. 27, 1905.

7 SHEETS—SHEET 1.

Witnesses
E. R. Peck

Inventor
George Gorton
By Hubert E. Peck
Attorney

No. 794,174. PATENTED JULY 11, 1905.
G. GORTON.
MACHINE FOR MAKING ABRADING SURFACES.
APPLICATION FILED JAN. 28, 1903. RENEWED FEB. 27, 1905.
7 SHEETS—SHEET 2.
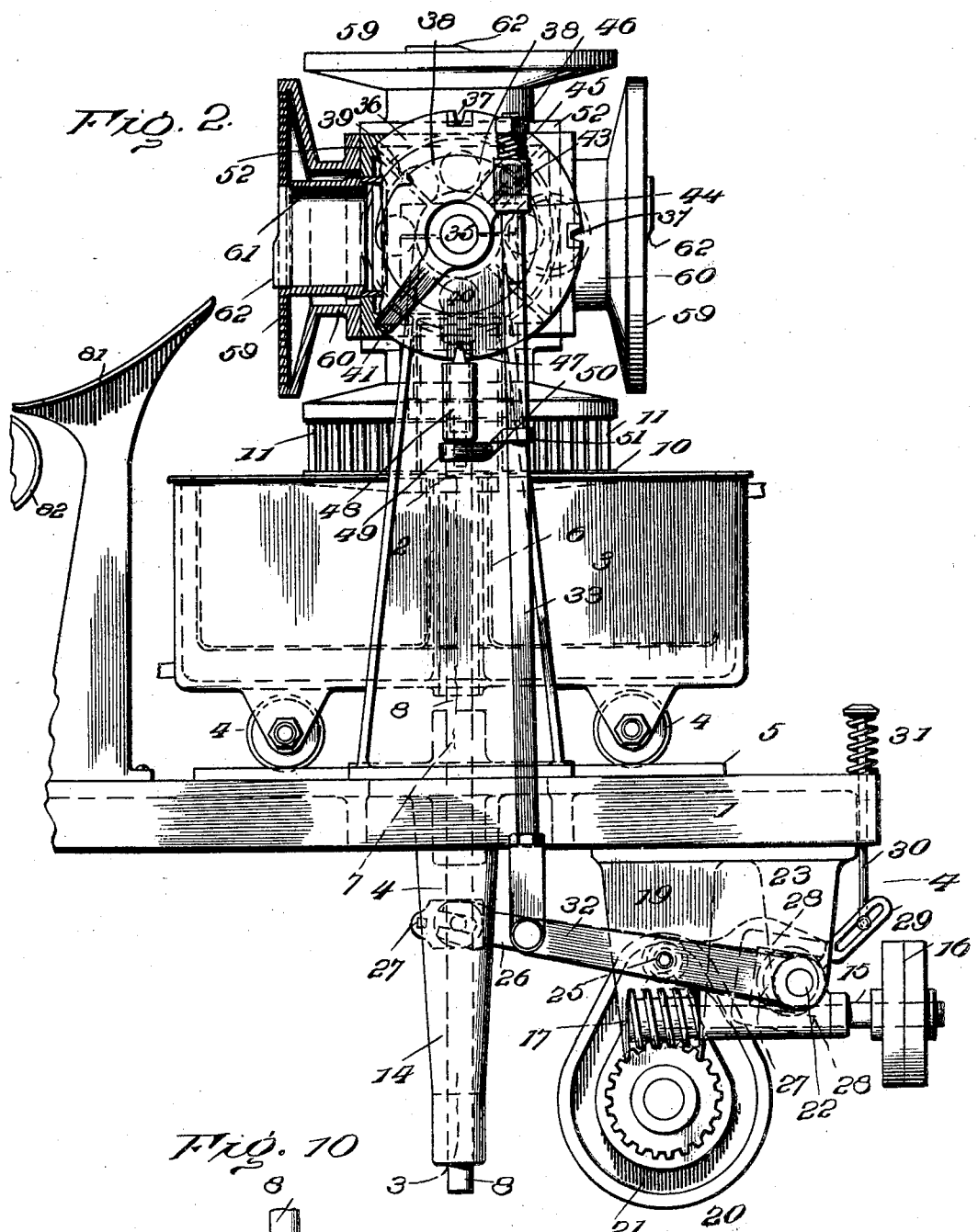
WITNESSES:
INVENTOR:
Geo Gorton
by Hubert T Peck
Attorney

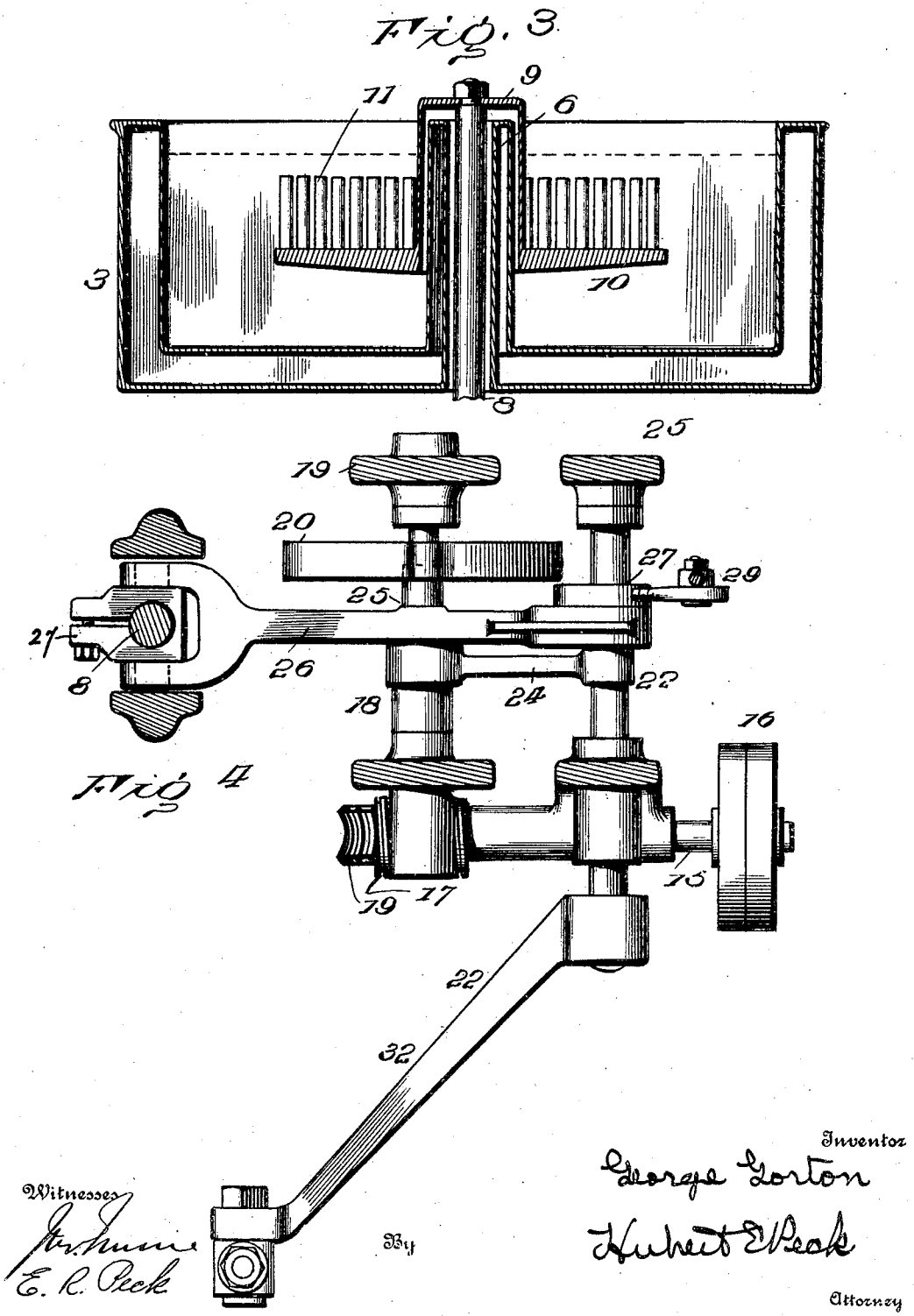

No. 794,174. PATENTED JULY 11, 1905.
G. GORTON.
MACHINE FOR MAKING ABRADING SURFACES.
APPLICATION FILED JAN. 28, 1903. RENEWED FEB. 27, 1905.

7 SHEETS—SHEET 4.

Witnesses
Inventor
Geo. Gorton
Attorney

No. 794,174. PATENTED JULY 11, 1905.
G. GORTON.
MACHINE FOR MAKING ABRADING SURFACES.
APPLICATION FILED JAN. 28, 1903. RENEWED FEB. 27, 1905.
7 SHEETS—SHEET 5.
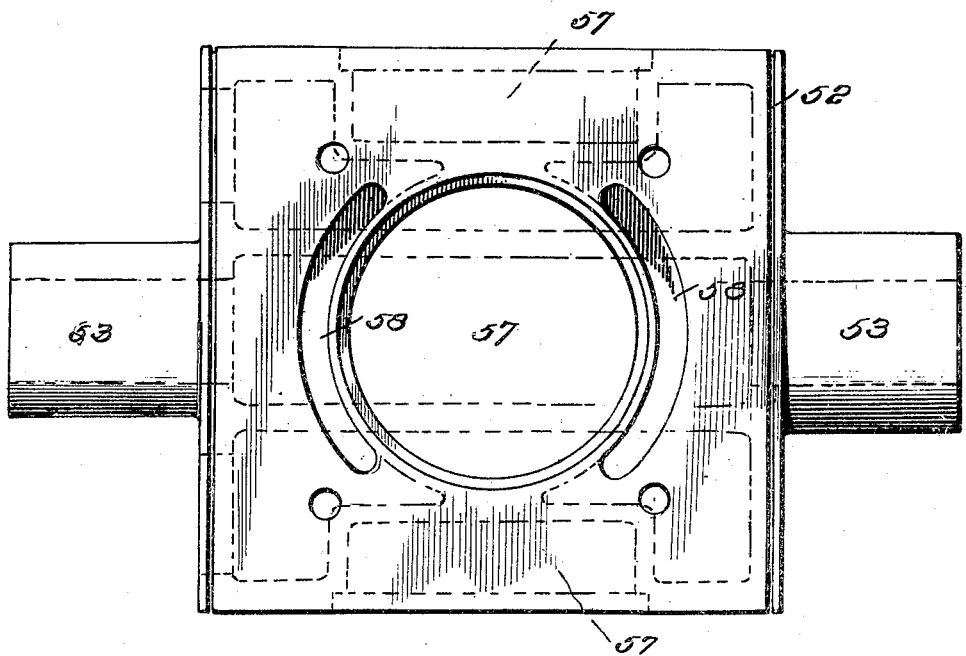
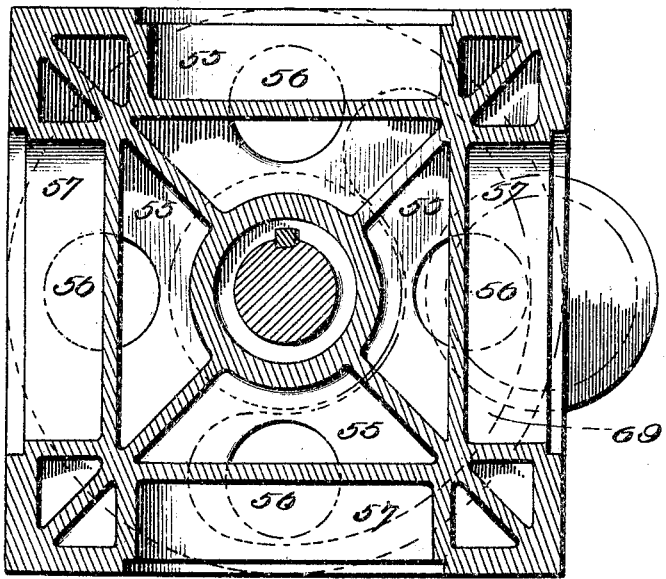
Witnesses
E. R. Peck
Inventor
George Gorton
Hubert E. Peck
Attorney No. 794,174. PATENTED JULY 11, 1905.
G. GORTON.
MACHINE FOR MAKING ABRADING SURFACES.
APPLICATION FILED JAN. 28, 1903. RENEWED FEB. 27, 1905.

7 SHEETS—SHEET 6.

FIG. 9.

WITNESSES:
Jw. Smire
E. R. Peck.

INVENTOR
George Gorton
BY Hubert E. Peck
Attorney

No. 794,174. PATENTED JULY 11, 1905.
G. GORTON.
MACHINE FOR MAKING ABRADING SURFACES.
APPLICATION FILED JAN. 28, 1903. RENEWED FEB. 27, 1905.

7 SHEETS—SHEET 7.

WITNESSES:
INVENTOR
George Gorton
BY
Hubert E Beck
Attorney

No. 794,174.  
Patented July 11, 1905.

UNITED STATES PATENT OFFICE.

GEORGE GORTON, OF RACINE, WISCONSIN.

MACHINE FOR MAKING ABRADING-SURFACES.

SPECIFICATION forming part of Letters Patent No. 794,174, dated July 11, 1905.

Application filed January 28, 1903. Renewed February 27, 1905. Serial No. 247,554.

*To all whom it may concern:*

Be it known that I, GEORGE GORTON, a citizen of the United States, residing at Racine, Racine county, Wisconsin, have invented certain new and useful Improvements in Machines for Making Abrading-Surfaces; and I do hereby declare the following to be a full, clear, and exact description of the invention, such as will enable others skilled in the art to which it appertains to make and use the same.

This invention relates to certain improvements in machines employed in the manufacture of abrading-surfaces on sheets, backings, or the like.

An object of the invention is to provide means for accurately and expeditiously depositing or distributing glue according to a predetermined design on and without completely coating the surface of a backing in the manufacture of abrading-sheets or other abrading-surfaces, so as to leave blank or uncovered portions intervening between the deposits of glue or between the convolutions of a continuous single spiral line of glue, whereby when the abrading material, dust, or grit is applied to such surface the abrading material will be taken up by the glue to form an abrading-surface of the same design as formed by the glue deposits, with the uncovered portions forming clearance-spaces between the surfaces of abrading material.

Another object of the invention is to provide a glue-depositing member formed to distribute glue on a sheet according to a predetermined design with means for supplying liquid glue to the distributing portions of said member and means to properly maintain a sheet at the glue-receiving position.

Another object of the invention is to provide means for increasing to the maximum the speed or rapidity and the accuracy with which the adhesive can be applied in certain fixed designs to sheets to which the grit or abrading material is afterward applied to produce the abrading-sheet with an abrading-surface divided into working portions of abrading material by intervening clearance-spaces formed by blank or uncovered portions of the sheet.

Another object of the invention is to provide means for accurately maintaining the sheet at the glue or adhesive receiving point or position while the adhesive is deposited on the sheet according to a certain fixed design and then withdrawing said sheet to which the adhesive has been applied from the adhesive-receiving position.

Another object of the invention is to provide means for holding the sheet in a fixed position and mechanism movable between said sheet and a supply of adhesive material for printing or depositing the adhesive in the design required on said sheet at a single stroke.

A further object of the invention is to provide a rotary or otherwise movable platen-head having means for holding the sheets thereto when in the adhesive-receiving position and successively bringing the sheets to the adhesive-receiving position and simultaneously-moving means for imprinting or depositing the required amount and desired design of adhesive on each sheet as it is brought to the adhesive-receiving position.

A further object of the invention is to provide means movable vertically into and below the surface of a body of liquid adhesive and upwardly therefrom to imprint or deposit the adhesive caught or retained on the upper surfaces of said means onto the surface of a sheet or other backing preparatory to the application of the grit or other abrading material to said sheet having the liquid or plastic adhesive deposited thereon.

A further object of the invention is to provide certain novel features, arrangements, and combinations of parts, whereby a highly efficient and improved machine is produced for use in the manufacture of abrading sheets, disks, or other surfaces.

With these and other objects in view my invention consists in certain novel features, in arrangements of parts, in combinations of elements, and in novel features of construction.

Figure 5:
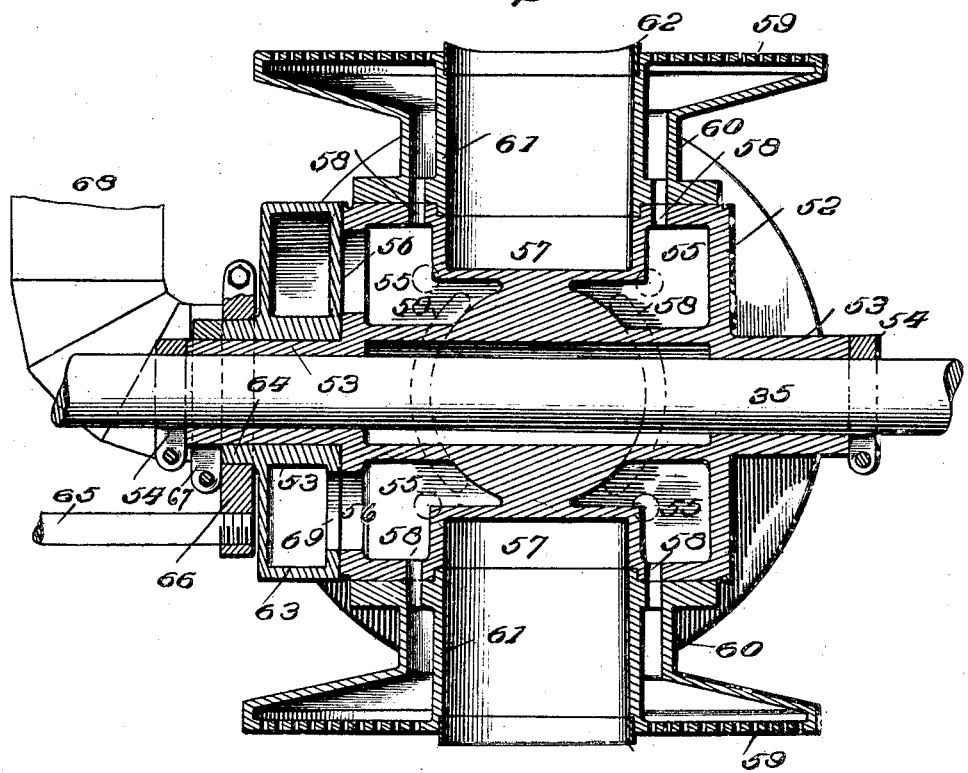
Figure 6:
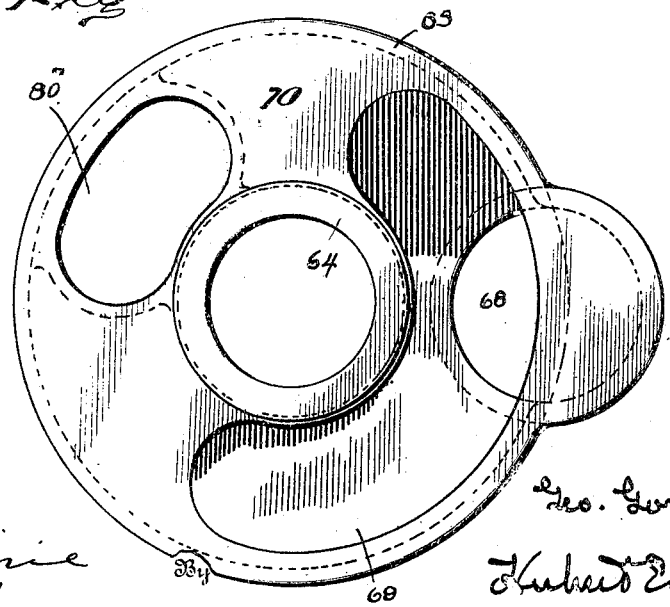
Figure 11:
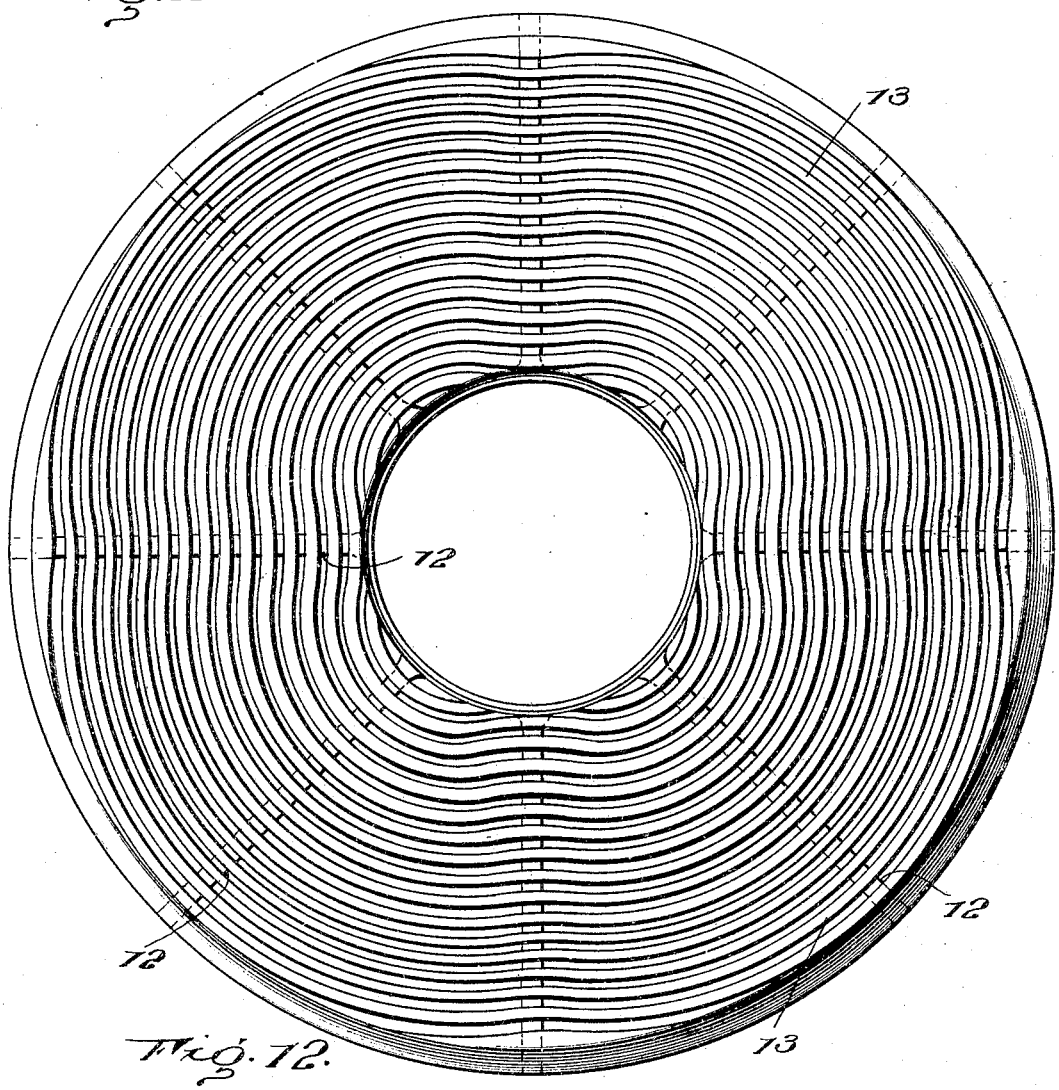
Figure 12:
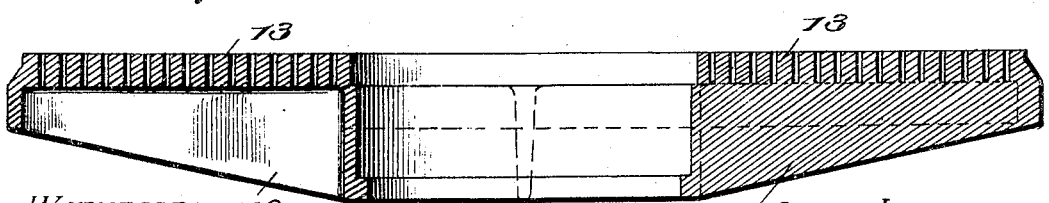

Referring to the accompanying drawings, which show a construction merely as an example for purposes of explanation in making clear the broad features of my invention, said construction being merely one example from among others within the spirit and scope of my invention, Figure 1 is an elevation of the machine, the glue imprinting or depositing head being shown in its elevated position in the act of depositing or imprinting the glue on a disk or sheet carried by the lower horizontal platen-plate of the rotary platen-head. Fig. 2 is an elevation, partially in section, showing the parts in the same positions as in Fig. 1 and looking at the machine in a plane at right angles to that of Fig. 1. Fig. 3 is a vertical central section through the glue-pot and glue-depositing head and taken in the plane of the line 3 3, Fig. 2, but showing the glue depositing or imprinting head at its limit of downward movement instead of at its limit of upward movement, as shown in Fig. 2. Fig. 4 is a sectional view on the line 4 4, Fig. 2, looking down. Fig. 5 is a detail enlarged sectional view of the rotary platen-head, taken longitudinally therethrough. Fig. 6 is a detail elevation of the inner face or side of the air chest or box. Fig. 7 is a detail side elevation of the rotary platen-head, the suction or platen plates thereof being removed, dotted lines indicating hidden portions thereof. Fig. 8 is a cross-sectional view through the rotary platen-head, the suction-mouths or platen-plates thereof being removed, the air chest or box being indicated at the end of the said platen-head, dotted lines indicating the elongated suction or air port of the said chest or box. Fig. 9 is an elevation of the upper part of the machine—that is, the portions above the supporting-platform—showing the platen-head in the act of turning and discharging a glue-covered disk to means for receiving the same and presenting the glue-covered face of the disk to receive a deposit of emery or other abrading material. Fig. 10 is a detail side elevation of the operating connections between the slide-rod of the glue-depositing head and the rock-shaft. Fig. 11 is a top plan view, enlarged, of a form of glue imprinting or depositing head which can be employed instead of the form shown in other figures of the drawings. Fig. 12 is a detail sectional view of the detached head shown in Fig. 11.

In the drawings, 1 is a base, stand, or platform on which are rigidly secured the upwardly-projecting vertical posts or pillars 2, usually located a suitable distance apart to receive between them a steam-jacketed glue-pot 3. Said pot is open at the top and, if desired, can be mounted on wheels 4, resting on parallel tracks or rails 5, secured on the platform 1, so that when various parts hereinafter described have been removed the horizontally-disposed glue-pot can be rolled along the rails 5 from the machine for cleaning, filling, or for other purposes. The glue-pot is formed with the central vertical guideway 6 extending therethrough from a point above the glue-line in the pot through the bottom of the pot. The steam-jacket extends up into this vertical guideway or passage, which is so arranged as to prevent the glue from the pot passing thereinto.

7 is a guideway or opening extending down through the platform 1 and alined with the guideway 6 of the glue-pot when said glue-pot is in its normal operative position.

8 is a vertical reciprocating slide-rod extending from a point below the platform 1 upwardly through the guide-opening or guideway 7 and through the guide-passage 6 through the glue-pot to a point above the glue-pot.

9 is a suitable support or hanger at its central horizontal elevated portion or closed top end removably fitted on the upper end of the reciprocating rod 8 and usually removably clamped thereon by a nut screwing on the projected upper end of said rod 8 down on said top end of the hanger 9. The top end of the hanger 9 is located above the upper end of the guideway 6 through the glue-pot, with the hanger depending around and outside of said guideway 6, so that when the said hanger is at its limit of downward movement with its top end about on the upper end of the guideway 6 the hanger will extend down at the exterior of said guideway 6 below the glue-line (indicated by dotted lines) and into the glue. 10 is a horizontally-disposed plate, disk, or head carried by said hanger 9 and having a central opening receiving the guideway 6 of the glue-pot and into which the lower end of said hanger extends. In certain figures of the drawings this plate or head 10 is shown provided with a multiplicity of rigid parallel vertical upwardly-projecting pins 11. These pins are all of the same length, so that their upper ends all terminate in the same horizontal plane. The upper ends of these pins are so formed that each will carry up from the body of liquid glue in the pot a drop or small quantity of glue on its upper end, as more fully set forth hereinafter. The pins are arranged or distributed in any suitable manner over the head or plate 10 to deposit the drops of glue on the ends of the pins onto a sheet or disk according to any desired design of abrading-surface it is intended to produce after the grit has been applied to the spots of glue deposited on the sheet. Usually the pins are closely arranged, so that closely-adjacent spots of glue will be deposited over the entire surface of one side of the sheet or disk, excepting narrow intervening blank or uncovered portions of the sheet between the spots of glue. However, the glue depositing or distributing head can be formed in any suitable manner to imprint or distribute the glue according to various designs over the surface of the paper sheet or disk and so as to leave blank or uncovered portions.

If it is desired to produce an abrading-surface formed of a multiplicity of closely-adjacent round spots or projections of abrading material with the intervening blank or uncovered portions, the head with pins, as just described, can be advantageously employed. If, however, it is desired to form the abrading-surface with lines or ribs of abrading material separated by intervening blank or uncovered portions, a form of head such as shown in Figs. 11 and 12 might be employed. The head shown in Figs. 11 and 12 can be formed in one piece of metal with the radiating arms 12 and the open center to receive the lower end of the hanger 9 and permit the head to reciprocate around the guideway 6. A series of rings, ribs, or flanges 13 are arranged on the arms 12 to form the horizontal top surface of the head. The head is open between the ribs or flanges 13 and between the radiating arms 12. The upper edges of the ribs or flanges 13 all terminate in the same horizontal plane, and the ribs 13 are spaced a distance apart equal to the width of the clearance-spaces it is desired that the completed abrading-surface shall have. The glue carrying or distributing ribs 13 can be arranged in any suitable manner to deposit or distribute the glue on the sheet or disk according to any design desired, and I do not wish to limit my invention to any particular design or construction of glue depositing or distributing surface.

It should be noted that as at present advised I prefer to removably secure the glue depositing or distributing head to the reciprocating support or carrier therefor—such, for instance, as rod 8—so that said head can be easily removed for cleaning purposes or to be replaced by a head having a different design of glue-distributing surface. Also in the specific construction shown in the example illustrated the hanger 9, carrying the glue-distributing head, can be easily lifted from the upper end of the rod 8 after the nut has been removed, so that the rod 8 can be dropped below the guideway 6 through the glue-pot, thereby releasing the glue-pot and permitting its removal from the machine, as hereinbefore mentioned. In the present example the glue-pot can be maintained in its normal operative position by the reciprocating rod 8 passing therethrough, or other securing means can be employed. However, as at present advised, I do not wish to limit myself to the constructions and arrangements of glue-pot and supporting and actuating devices for the glue-distributing head as shown herein, as various other constructions and arrangements can be employed within the spirit and scope of my invention.

14 is a U-shaped hanger rigid with and depending from the platform 1 and at its lower end formed with a guide-opening receiving and through which the lower end of the rod 8 reciprocates.

Various means can be employed for reciprocating and controlling the movement of the rod 8 and causing the same to operate in proper sequence with other parts of the machine where an automatic movable disk or sheet-receiving platen is employed in connection with a reciprocating glue depositing or distributing head. As an actuating mechanism which might be employed for this purpose I show a drive-shaft 15, mounted in suitable hangers depending from the platform 1 and provided at its outer end with a drive-pulley 16. This shaft extends inwardly and at its inner end is operatively connected, through the medium of worm-gearing 17, with the cam-shaft 18, arranged at right angles to the shaft 15 and rotated thereby. The cam-shaft 18 is carried by suitable hangers, such as 19, rigid with and depending from the platform 1.

20 is a vertically-disposed cam rigid with the horizontal cam-shaft 18 and having the continuous cam-groove 21 formed in a vertical face thereof.

22 is a horizontal rock-shaft parallel with the cam-shaft 18 and carried by suitable hangers, such as 23, depending from and rigid with the platform 1.

In the specific example illustrated the vertical plane including the cam-shaft 18 is located between the reciprocating rod 8 and the rock-shaft 22.

24 is a lateral arm at one end rigid with the rock-shaft 22 and at the other end having a lateral stud 25 projecting into and confined in the groove 21 of the cam 20.

26 is a rocking lever at an intermediate point in its length mounted to rock on the stud 25. The inner end of this lever 26 is loosely connected to the reciprocating rod 8 to reciprocate the same. The said inner end of the lever 26 can be forked to receive a block 27 on the rod 8, having pintles projecting loosely into longitudinal slots in the arms of the forked or bifurcated end of said lever, the arrangement being preferably such that said block 27 on the rod 8, provided with the pintles confined in the slots of the legs of the bifurcated end of lever 26, can be released from rod 8 and permit said rod to drop through the same, so that said rod 8 can be moved down free of the glue-pot when it is desired to remove the glue-pot, as hereinbefore set forth.

The lever 26 extends outwardly from the stud 25 to the rock-shaft 22, and said outer end of the lever 26 is enlarged and bifurcated to receive a cam 27, mounted loosely on the rock-shaft 22, with the upper and lower legs 28 of said bifurcated outer end of the lever 26 resting against the upper and lower portions of the periphery of said cam. 29 is an upwardly and outwardly longitudinally slotted arm rigid with said cam 27.

30 is a push-rod, at its lower end having a lateral stud loosely confined in the slot of the arm 29. This push-rod 30 extends vertically loosely through the platform 1 and at its upper end is formed with a foot-piece or head.

31 is a coiled expansive spring located on the push-rod 30 between the upper face of the platform 1 and the foot-piece on the upper end of said push-rod. This spring yieldingly upholds the push-rod to its limit of upward movement and through the medium of the arm 29 holds the cam 27 in its normal position, with the lever 26 so arranged that the glue depositing or distributing head will move to its extreme limit of upward movement.

32 is a crank-arm extending laterally from the rock-shaft 22 to a point at one side of the machine and at its outer end is pivotally joined to the lower end of a pull-rod 33, which operates the means hereinafter described for presenting the sheets or disks to and removing the same from the glue-receiving position.

As the cam-shaft 18 is continuously rotated the arm 24 is oscillated or swung vertically by the stud 25 and the peculiar formation of the cam-groove. The cam-groove is so formed as to carry the arm 24 from its highest to its lowest position and back to its highest position during each complete revolution of the cam 20. The rock-shaft 22 is hence rocked to simultaneously swing the arm 32 with the arm 24. The lever 26 being mounted on the stud 25 is swung vertically with the arm 24 and, in effect, forms a continuation of the arm 24 and reciprocates the rod 8 and the glue depositing or distributing head to perform its intended function. The cam 27 forms the fulcrum of the lever 26, the power being applied at the stud 25 and the work being located at the inner end of said lever where coupled to the rod 8. The cam 27 is normally so located with respect to the lever 26 that the inner end of the lever 26, and consequently the glue-distributing head, will move at each stroke to their limits of extreme upward movement. However, should it for any reason be desirable that the glue-depositing head be not moved at any stroke to its extreme limit of upward movement the operator by forcing down the push-rod 30 with his foot will turn the cam 27 on the rock-shaft 22, and thereby elevate the fulcrum of the lever 26, and hence lower the limit of upward movement of the glue-depositing head, so that said head will not reach the glue-receiving position. The upward stroke of the glue-depositing head can be thus varied independently of and without effecting the movement of the rock-shaft 22 and the arm 32, operating the sheet or disk moving devices.

Various means can be employed for presenting the sheets or disks on which the abrading-surface is to be formed to the glue-receiving position and maintaining the same in such position for the desired length of time, although it is obvious that according to the most simple embodiment of certain broad features of my invention it is only necessary that the sheets be moved by hand or otherwise to and from the glue-receiving position. The following is an explanation of one form of mechanism which can be employed for presenting the sheets or disks successively to the glue-receiving position, maintaining each disk in the glue-receiving position until the glue has been distributed or deposited on the exposed surface thereof, and then removing the sheets successively from the glue-receiving position after the glue has been deposited thereon. The upper ends of the posts or pillars 2 are provided with journal-boxes 34, in which the horizontal rotary shaft 35 is mounted. Said shaft is arranged centrally over and a distance above the glue-pot and the reciprocating glue-depositing head and at one projecting end has a vertically-disposed disk or wheel 36, rigidly secured thereto. Said disk 36 is formed with equally-spaced edge slots or notches 37. In the present instance the disk is shown provided with four equally-spaced locking slots or notches 37. Beyond its outer vertical face the disk 36 is provided with a vertically-disposed annular flange 38, which, in effect, forms a disk rigid with the shaft 35 and parallel with and beyond the outer face of the disk 36. The flange 38 is formed with edge notches or ratchet-teeth 39, which are equally spaced. In the present instance the flange or disk 38 constitutes what might be termed a "ratchet-wheel" and is formed with four notches 39, equally spaced. 40 is a rock-arm loosely confined to rock on the projecting end of the shaft 35. One end of said rock-arm 40 is formed with a head 41. This head 41 carries the reciprocating radial spring-held dog or pawl 42, yieldingly pressed inwardly against the outer edge of the flange 38 and adapted to enter the notches 39 to cause the flange 38 to turn with the rock-arm 40 when said rock-arm is oscillated in one direction and to slip out of said notches 39 and permit the rock-arm to return to its normal position when oscillated in the opposite direction independently of the flange 38. The opposite end of the rock-arm 40 is loosely mounted and confined on a stud projecting laterally from a sleeve 43, through which the upper portion of the pull-rod 33 loosely passes. The sleeve 43 is yieldingly held down on a rigid stop 44 on said rod 33 by coiled expansive spring 45 on the upper end of rod 33 and interposed between the upper end of the sleeve 43 and the nut 46, screwed on the upper extremity of rod 33. 47 is a reciprocating vertically-movable bolt or lock arranged radially of the disk 36 with its upper end formed to enter the notches 37 in the disk 36 and hold the disk and the shaft 35 against rotation. This bolt 47 is confined in a casing 48, secured to one of the posts 2 and located beneath the disk 36. A spring is provided to yieldingly hold the bolt 47 upwardly, with its inner end against the edge of the disk 36, so that as the disk revolves the bolt will spring or project into a notch 37 as it is presented to the bolt. The lower end of the bolt 47 which projects below the casing 48 is provided with a sleeve 49, rigidly secured thereto and projecting laterally therefrom, and provided with a pivoted vertically-swinging toe 50, beveled or inclined at its under edge and free to swing vertically from its horizontal position, but limited against swinging downwardly from its horizontal position. This swinging toe projects into the path of movement of a tappet 51, rigid with the pull-rod 33 and projecting laterally therefrom, so that as the pull-rod 33 moves upwardly the tappet 51 will engage the under edge of the toe 50 and swing said toe upwardly without moving the bolt 47 until the tappet slips past the toe, which thereupon drops to its normal horizontal position. When the pull-rod 33 is drawn downwardly, the tappet 51 engages the upper edge of the toe 50 and draws the bolt 47 downwardly out of a notch 37, and thereby releases the disk 36 and shaft 35, so that the shaft can be rotated by the pull-rod 33 through the medium of the rock-arm 40. As the rod 33 continues on its downward movement the lateral movement of the rod is such that the tappet 51 will slip from the edge of the toe 50 and permit the bolt 47 to spring up into engagement with the edge of the disk 36 in readiness to enter the next notch 37 as the disk turns. On an intermediate portion of the shaft 35 and directly over the glue-depositing head and the glue-pot is located a hollow drum, box, or platen-head 52, rigidly secured to the shaft to rotate therewith. In the specific example illustrated this head is composed of a casting in the form of an oblong box rectangular in cross-section and having a central hub receiving and secured to the shaft 35 and projecting at the ends of the box to form the end projecting hubs 53. 54 represents collars secured on the shaft 35 at the ends of the hubs 53 to hold the platen-head on the shaft against longitudinal movement. In the present instance the body, box, or casting 52 is formed with four similar longitudinal exterior side faces and the box is internally divided into four similar air-chambers 55, arranged longitudinally behind the said longitudinal faces, and said air-chambers 55 are shut off from communication from each other by internal walls or partitions. At one end of the body or box 52 are formed the outlet or suction ports 56, said ports being similar and equally spaced, one port for each chamber 55. Each longitudinal side wall or face of the box or body 52 is formed with a central, usually circular, inwardly-depressed socket or seat 57, closed or imperforate, so that there is no communication therethrough to the air-chambers 55. Each longitudinal side wall or face of the body or box 52 is formed with one or more slots or openings 58 extending therethrough to the chamber 55 behind the wall. These slots or ports 58 can be, if desired, arranged around the seats 57, as more clearly shown in Fig. 7, and form inlet ports or openings into the chambers 55 of the box or body 52. Each longitudinal side face of the box or body 52 is provided with a suction mouth or device which constitutes a platen or platen-plate. It is obvious that said box can be provided with any desirable number of platens, although in the drawings I have shown a form which can be conveniently employed wherein the rotary platen-head comprises a rectangular box or body 52, having four side faces, and consequently four equally-spaced platens or suction-mouths. However, I do not wish to so limit my invention. In the specific example shown each suction cup, mouth, or platen consists of a hollow body having a flat outer wall or plate 59, which is perforated throughout and which has an open center corresponding to the open center of the glue-depositing head. Said platen-plate 59 is carried by a hollow body comprising a neck 60, flaring outwardly at its outer end to the outer surrounding edge of the plate 59. The inner end of the neck 60 is flanged and fitted to a side face of the box 52 and tightly secured thereto by suitable bolts, so that the slots 58 of the box 52 open into the hollow interior of said neck and are hence in direct communication with the perforations through the platen 59. An imperforate cylindrical wall 61 open at the ends extends through the neck 60 and through the central opening of the platen-plate 59 forming a segmental outwardly-projecting flange 62. The inner end of this cylindrical wall 61 fits within and forms a tight joint with the socket 57 of the side face of the box 52, and thus forms an outward extension of the socket 57 through the neck 60 and the platen-plate 59, said socket being closed against communication with the interior of the box or body 52 and the suction-passages therefrom to the platen-plate 59. Each side face of the box or body 52 is provided with a platen-plate and supporting devices such as described, each platen-plate having suction communication only with its particular air-chamber 55. 63 is an air chest or box arranged at the end of the platen-head, having the ports 56. This air-chest is formed hollow, with a central hub 64 projecting at the outer end of the box. Said hub 64 is fitted loosely on an end hub 53 of the platen-head, so that the platen-head hub turns in the hub 64 of the air-chest, the air-chest being held against rotation by a rod 65 extending through an opening in the adjacent post 2, and at its inner end secured to a collar 66, clamped on the projecting end of the hub 64 of the air-chest. The collar 66 is split, and its ends are drawn together by a bolt to tightly grip the hub 64 and yet to permit axial adjustment of the air-chest on the hub 53 when the collar 66 is loosened. 67 is a clamping-collar on the end of the hub 53 projecting beyond the hub 64 and abutting against the end edge of the hub 64 to hold the inner face of the air-chest into the desired close contact with the end face of the platen-head and to permit adjustment of the air-chest inwardly to take up wear. The end face of the platen-head and the inner face of the air-chest engaging therewith are preferably ground smooth and true to form an approximately tight joint between said engaging faces. 68 is an air exhausting or suction duct opening through the outer end of the air-chest into the interior thereof and in communication with any suitable continuously-acting air-exhausting device. (Not shown.) The inner face of the air-chest 63 is formed with an elongated inlet-port 69, adapted to register with the ports 56 of the platen-head as the platen-plates of said ports pass from the upper horizontal position to the lower horizontal position, which is the glue-receiving position. The port 69 is so arranged that when the platen-head is in a normal position, as shown in Figs. 1 and 2, the port 56 of the platen-plate in the upper horizontal position will be closed against suction communication by the imperforate portion 70 of the inner wall of the air-chest, while the port 56 of the platen-plate in the lower horizontal or glue-receiving position will be over and in communication with the lower end of the elongated port 69, and hence in suction communication with the air-chest. The port 56 of the platen-plate to the right of Fig. 2 will be in suction communication with the air-chest through the intermediate portion of the elongated port 69, while the platen-plate to the left of Fig. 2 will be shut off from suction communication with the air-chest as its port 56 will be about to pass into registration with the releasing-port 80 of the air-chest between the ends of the port 69 and open to the atmosphere and closed against communication with the interior of said chest.

In the process of manufacturing abrading-disks the glue is applied to one face of each paper or other fabric sheet and the finely-divided or coarse, as the case may be, grit or abrading material is then sprinkled on the glue while in the plastic state, so that the grit is taken up by the glue. The sheets are then laid aside to dry. The glue acts as a binder for the grit and secures the same to the surface of the sheet forming the abrading-faces projecting from the surface of the sheet. The present invention is employed in the manufacture of abrading-sheets having the abrading-surfaces divided or broken up by blank or uncovered portions of the sheet, thereby forming clearance-spaces to permit the rapid discharge of the grit or refuse worn from the surfaces of the work and abrading-sheet when the same is in use. In the manufacture of such abrading-sheets it is desirable to distribute the glue on the face of the sheet exactly according to the same design formed by the abrading material on the completed abrading-sheet with the intervening clearance-spaces. It is hence desirable to prevent the glue spreading or running on the sheet during the process of distributing the same thereon, and it is also necessary for the economical production of such abrading-sheets that the same have the glue distributed thereon with rapidity, so that the sheets can be quickly handled. It is also desirable that all the glue to be deposited on the sheet should be simultaneously distributed thereon, so that all portions of the glue on a sheet will be in the same plastic condition throughout, or approximately so. According to my invention I can distribute the glue according to the required design on successive portions of a continuous sheet of paper moved along step by step; but in the manufacture of abrading disks or sheets the paper disks are usually first cut out of the desired form before the glue and abrading material are applied thereto. Each paper disk is usually, although not necessarily, cut out circular in form with the central opening, conforming in shape about to one of the platen-plates—shown, for instance, in Fig. 1.

In the operation of the machine described herein a paper disk or sheet is placed on the top horizontal platen-plate, with the central projecting flange 62 extending through the central opening of the sheet, thereby alining the sheet properly on the platen-plate and holding the same in the proper position thereon, covering all of the perforations in the platen-plate. The sheet can be placed on the platen-plate while the platen-head is held against rotation by the bolt 47 entering a notch 37. The platen-head is held against rotation during the latter portion of the downward movement of the glue-distributing head and the pull-rod 33, while the pull-rod 33 is moving down freely through and independently of the rock-arm 40 and against the tension of spring 45 and while the glue-distributing head and the pull-rod 33 are held at their limits of downward movement as the concentric low portion of the cam-groove 21 passes the stud 25 and while the glue-depositing head is making its upward stroke and the push-rod 33 is moving upwardly and swinging the rock-arm 40 on its return stroke and until after the glue-depositing head has started on its return or downward stroke. The bolt 47 is then drawn from the notch in the disk 36 by the tappet, and the pawl 42 of the rock-arm 40 engages a notch 39 of the flange 38, and thereby rotates the shaft 35 and the platen-head one-quarter revolution, or until the bolt 47 drops into the next succeeding notch 37. As soon as the uppermost platen-head begins to move to the right the port 56 of said top platen-plate which has received the paper disk begins to open or pass into communication with the inlet-port 69 of the air-chest, and the pressure is thereby reduced through the air-chamber 55 in communication with said platen-plate, and consequently the paper disk is drawn tightly against the flat outer face of the platen, and is thus held and drawn against the platen-plate throughout the movement of the platen-head until said port 56 leaves the lower end of the port 69 and the platen-plate has passed the glue-receiving position, thereupon the suction is cut off from said platen-plate and the paper sheet, with the glue distributed thereon, can be removed from the platen-plate or can be allowed to drop therefrom onto a suitable support or carrier.

The release-port 80 preferably opens usually to the atmosphere through the air-chest and is shut off from suction communication with the interior of the air-chest, so that as each platen, with its glue-coated disk, reaches about the position shown by the left-hand platen of Fig. 9 the interior of the platen will be opened to the atmosphere, thereby restoring the pressure in the suction-chamber of the platen. The disk will thereupon be released from the platen and will slide downwardly and drop therefrom glued-face up. Each centering-flange 62 is usually a segment of a circle, so that the disk can easily slide or drop from the platen without being held or retarded by the flange, except that the flange may assist to a certain extent in guiding the disk outwardly from the platen.

If it is desired to work the machine very rapidly, means can be provided to force air through the port 80, and hence cause very rapid discharge of the glued disks as they reach the dropping or discharging position.
Any suitable means can be provided to receive and guide or convey the glued disks as they drop from the platen-heads. For instance, I show a suitably-supported downwardly and laterally curved guide or slide way 81, arranged beneath the disk-discharging position successively reached by the platens and so formed as to be engaged by the lower edge of each falling disk and to guide each disk as it slides down the top face of the guide, about horizontally and with its glued face up, onto the rearwardly-traveling top ply of a horizontal suitably-driven continuously-moving endless conveyer or apron 82, which successively conveys the disks rearwardly from the machine and exposes the glue thereon to a shower of emery or other abrading-material grit from a distributing device or receptacle 83. A continuous shower of grit can fall from the receptacle, and the conveyer carries the disks successively through the shower, or, if desired, the grit can be properly scattered by hand over the glued faces of the disks as carried along by the conveyer. Means can be provided to catch and collect the surplus grit and again restore the same to the receptacle. The glued disks, after having the necessary quantity of grit properly deposited thereon, are removed and properly placed for drying.

If desired, the conveyer can be arranged to receive the disks directly from the platens without the interposed guide or deflector 81.

If the platen-head is shown provided with four equally-spaced platen-plates arranged in planes at right angles to each other, the disk 36 is shown provided with four equally-spaced notches 37, so arranged that at each quarter-revolution the platen-head will be locked in position with one platen-plate in the lower horizontal position to receive the impress of the glue-distributing head and with its paper disk or sheet squarely at right angles to the plane of movement of the glue-distributing head.

The glue-distributing head starts on its downward movement before the bolt or latch 47 releases the platen-head, and hence has moved down some distance before the platen-head starts on each quarter-turn.

The limit of downward movement of the glue-depositing head is so arranged as to cause the glue-depositing head to become completely immersed in the glue, the upper glue-carrying edges of said head passing down below the glue-line at each stroke of said head. When the glue-depositing head starts on its upward movement, a platen-plate, with its paper disk, has been brought to the glue-receiving position and locked. The head passes upwardly to the paper sheet and distributes the glue on the sheet from the top glue-carrying edges of the head, the spider 9 of the glue-depositing head extending into the socket in the platen-head formed by wall 61 and recess 57.

The glue-conveying edges of the glue-depositing head collect and carry up from the body of liquid glue the proper quantities of glue for deposit on the paper sheet or disk to form abrading ribs or projections on the disk of the desired size and dimensions after the glue has been deposited on the disk and the grit has been sprinkled thereon. The quantity of glue carried up by said edges of the glue-depositing head can be varied by varying the consistency or fluidity of the body of glue, and the lines or spots of glue are distributed on the paper disk for all practical purposes exactly as the same are distributed on the edges of said glue-distributing head. As the glue-depositing head brings the lines or spots of glue thereon into contact with said paper sheet the glue is taken up by or adheres to the surface of the sheet, and it is not necessary that the glue-conveying edges themselves come into contact with or press against the sheet, and thereby cause the lines or spots of glue to run or spread thereon, for as the head recedes from the paper sheet the glue having come into contact with the paper will adhere thereto and leave the metal edges.

By means of the mechanism for varying or raising and lowering the fulcrum-point of the lever 26 the approach of the glue-conveying edges of the head toward the paper disk can be controlled to a nicety according to the thickness of the paper, the fluidity of the glue, or for other considerations. Also said means for determining the limit of upward movement of the glue-conveying head serves as a device for preventing deposit of glue on a platen-plate if for any reason a platen should reach the glue-receiving position without a paper disk covering the surface thereof. In such event the operator merely presses down the push-rod 30 after said uncovered platen reaches the glue-receiving position, and hence prevents the glue-depositing head moving to its normal limit of upward movement and bringing the glue thereon into engagement with the uncovered platen.

When the machine is not in operation, the glue-depositing head can be kept immersed in the glue to prevent deposit and hardening of glue thereon, and during the operation of the machine the said head is beneath the glue-line a greater portion of the time, and by moving the head completely into the glue below the glue-line the desired quantity of glue is not only carried up at each stroke, but the glue is prevented from hardening on the head.

Material advantages are attained by providing means to hold each disk or paper sheet throughout its entire surface when at the glue-receiving position in a perfectly flat position and throughout in a plane accurately parallel with the plane of all the glue-conveying edges of the glue-depositing head, so that all of said edges will simultaneously and equally deposit the glue carried thereby on the paper sheet. By providing each platen-plate throughout its surface with the numerous closely-arranged perforations or suction-openings the paper sheet will be drawn flat and evenly throughout against the platen and by a force greater than that exerted by the glue when adhering to the sheet as the glue-depositing head retires therefrom.

It is obvious that my invention is not limited to a movable glue-depositing head, as the operation of the parts might be reversed and the platen and glue-pot move vertically to perform the glue-depositing operation while the glue-depositing head remains stationary. Also I do not wish to limit myself to the employment of the central projecting flange 62. In Fig. 1 the platen-plates are shown without said flange. Also the carrying devices for the glue-depositing head can be so arranged that the employment of central socket or recess within each platen can be avoided, and also the said carrying devices can be otherwise arranged than passing up through the glue-pot.

I use the term "glue" herein in a broad sense as meaning any kind of an adhesive suitable for the purpose.

As at present advised, I do not wish to limit the broad feature of my invention to simultaneously distributing all the glue deposits of the predetermined design on a single sheet held stationary and flattened out throughout its entire surface against a platen, nor to the employment of a reciprocating glue-distributing member, as I might employ a movable platen receiving a moving sheet exposed at one face or a portion of one face in engagement with glue-depositing portions arranged according to a predetermined design of a movable glue-distributing member opposing said platen, said portions being supplied with liquid glue in any suitable manner to cause the accurate distribution of the glue on the face of the sheet according to the predetermined design and permitting comparatively speedy movement of the sheet along or from the glue-receiving position.

It is evident that various changes and modifications might be resorted to in the forms, arrangements, and constructions described. Hence I do not wish to limit my invention to the constructions shown, but consider myself entitled to all changes falling within the spirit and scope of my invention.

Having thus described my invention, what I claim is—

1. In a machine for the purpose described, the combination of a platen, means for holding a single flexible sheet flatly against the platen with one face entirely exposed, a glue-depositing head, and means for bringing the sheet and head together, substantially as described.

2. In a machine for making abrading-sheets, the combination of a platen having a flat sheet-receiving face, means for maintaining a single sheet on said face in a flat even condition to receive the glue, a source of glue, a glue-distributer, and operating means for immersing said distributer in the glue and bringing said sheet and distributer together, whereby the entire glue design is deposited simultaneously over the exposed face of said sheet.

3. In combination, a flat sheet-receiving platen, means to maintain the sheet on said platen with its glue-receiving face entirely exposed, a glue-pot, a glue-depositing head, and means for reciprocating certain of said elements vertically to completely immerse said head in the glue and bring said head and the sheet together above the glue-line, substantially as described.

4. In combination, in a machine for depositing liquid glue on sheets, a glue-pot, a glue-depositing head having uniformly-disposed glue-retaining top edges all in the same horizontal plane, a movable sheet-carrying platen, and actuating means for vertically immersing said head in the glue with said edges below the glue-line and bringing the sheet and said edges vertically together above the glue-line, substantially as described.

5. In a machine for distributing glue in a uniformly-disposed design on sheets in the process of making abrading-disks, the combination of movable sheet-carrying means for holding a sheet in a horizontal glue-receiving position, a vertically-movable glue-depositing head, means for maintaining a body of liquid glue in the path of said head, and means for completely immersing said head in said glue and moving the same upwardly through the glue to said sheet, substantially as described.

6. In a machine for distributing glue on sheets in making abrading-disks, the combination of a vertically-movable glue-distributing head formed with uniformly-disposed glue-depositing portions, means for supplying glue to the top glue conveying and depositing portions of said head, operating means for bringing said head and a horizontally-maintained sheet vertically approximately together and then separating the sheet and head, and means for removing and reversing the glue-coated sheet, substantially as described.

7. Means for retaining a body of liquid glue in combination with a reciprocating glue-depositing head, and means for moving the same into and out of the body of glue from a point below the glue-line to a glue-distributing position above the glue-line, in combination with a movable platen formed to support a sheet at said glue-distributing position, substantially as described.

8. A vertically-movable glue-depositing device having top glue-conveying edges or surfaces arranged in the same horizontal plane and conforming to the design in which the glue is to be deposited or distributed in uniform areas over the surface of a sheet, in combination with means for supplying liquid glue to said edges or surfaces, sheet-carrying means for maintaining a single sheet at the glue-receiving position and removing the same therefrom without disturbing the glue design thereon and actuating means, substantially as described.

9. In combination, in a mechanism for distributing glue on a surface of a sheet for making abrading-disks, a platen receiving a single sheet, means for maintaining the sheet on the platen, a glue-distributing member having glue-depositing portions of the design of the entire abrading-surface to be formed and to simultaneously distribute all the liquid glue on the sheet according to the predetermined design, means for supplying liquid glue to said depositing portions, and operating means, substantially as described.

10. In a machine for distributing glue on sheets in the process of manufacturing abrading-disks, the combination of a movable sheet-carrying platen, means to maintain a sheet thereon with a face exposed at the glue-receiving position, a movable glue-distributing member having glue-depositing portions arranged according to a fixed design to simultaneously deposit the entire predetermined design in glue on said sheet, and means for supplying liquid glue to said portions, substantially as described.

11. In a machine employed in the manufacture of abrading-disks, the combination of a movable platen at its under surface adapted to receive the sheet with its bottom face exposed, means for holding the sheet to and releasing the same from said platen, mechanism for simultaneously distributing all liquid glue over said bottom face of the sheet according to the predetermined design of the abrading-surface to be formed, and means maintaining a body of liquid glue in the path of movement of said mechanism for supplying glue thereto, substantially as described.

12. In a machine for use in the manufacture of abrading-disks, the combination of movable means for successively presenting separate surfaces to the glue-receiving position, glue-distributing mechanism having glue-depositing portions all in one plane and uniformly arranged according to a fixed design to simultaneously distribute areas of glue in a predetermined design over each surface presented at the glue-receiving position, and means simultaneously supplying glue to all of said portions, substantially as described.

13. In a machine for use in the manufacture of abrading-disks, the combination of a movable platen arranged to maintain a sheet with its bottom face at the glue-receiving position, means maintaining a body of liquid glue, and a movable glue-distributer beneath said platen and having a divided glue-depositing face in one plane and movable in said body of glue and arranged to convey glue therefrom and simultaneously deposit the areas of glue over approximately the entire under face of said sheet in the design of the abrading-surface to be formed thereon, substantially as described.

14. In a machine for depositing glue over the surfaces of sheets in the manufacture of abrading-sheets, a glue-depositing head having its entire divided upper face formed by uniformly-disposed areas of glue conveying and depositing edges arranged in a fixed design to simultaneously deposit the glue over approximately the entire glue-receiving face of a sheet in the predetermined design of the divided abrading-surface to be formed in combination with a movable sheet-receiving platen and means to hold the sheet thereto and release the sheet therefrom thereon, substantially as described.

15. In a machine of the character described, a glue-pot, in combination with glue-depositing means movable vertically into and out of the glue in said pot and at its top face provided with means to convey glue upwardly from said pot and deposit the same on a sheet according to a predetermined design, and a platen formed to carry a sheet to and move the same from the glue-receiving position substantially as described.

16. In a machine for use in the manufacture of abrading-disks, the combination of a sheet-carrying platen, means for maintaining a sheet at the glue-receiving position, and mechanism for simultaneously depositing the entire predetermined design of glue on a face of said sheet according to the divided abrading-surface to be formed thereon, substantially as described.

17. A sheet-carrying platen, and means for holding a single sheet stationary thereon at the glue-receiving position with its entire flat outer face exposed, in combination with movable glue-distributing means having a glue-depositing face formed to deposit, at a single stroke, a predetermined design of uniformly-disposed areas of glue on said outer face of the sheet, substantially as described.

18. A movable platen maintaining a sheet at and removing the same from the glue-receiving position, in combination with a glue-pot, a reciprocating glue-distributing head having a range of movement from below the glue-line in said pot to said glue-receiving position, a carrier for said head, and operating means for said carrier, substantially as described.

19. In combination, a movable glue-depositing head, means for supplying glue thereto, operating means for said head, and mechanism for varying the stroke of said head toward the glue-depositing position, substantially as described.

20. In combination, means for maintaining a sheet at the glue-receiving position, means for depositing glue thereon, mechanism for bringing said sheet and said glue-depositing means together to distribute the glue on the sheet, and manually-operated controlling means for determining at any stroke the limit of movement of said sheet-maintaining means and said depositing means toward each other, substantially as described.

21. In combination, means for maintaining a sheet at the glue-receiving position, a glue-depositing head movable to and from said position, operating means for said head, and manually-operated controlling means acting on said operating means to determine the limit of movement of said head toward said position, substantially as described.

22. In combination, a glue-pot, a glue-depositing head movable vertically into and out of the glue in said pot, a reciprocating carrier for said head, a hanger at its lower end carrying said head, means removably confining the upper end of the hanger to the carrier, and operating means for the carrier, substantially as described.

23. In a machine of the character described, the combination, of a removable glue-pot, a glue-distributing head, a reciprocating hanger normally extending into said pot and carrying said head into and out of the glue therein, operating means for said hanger, and means whereby the head and hanger can be removed from the pot to permit removal of the pot, substantially as described.

24. In a machine of the character described, in combination, a glue-pot, a movable carrier extending into the pot, a horizontally-disposed glue-depositing head carried by said carrier into and out of the glue in said pot, and a hanger depending from the carrier and to which said head is confined, substantially as described.

25. In combination, a vertically-removable carrier, operating means therefor, a removable glue-pot into which the carrier extends and which normally maintains said pot in position, and a glue-depositing head moved by said carrier into and out of the glue in said pot, said head having a horizontal top glue conveying and depositing face.

26. In combination, a glue-pot having a vertical guideway therethrough to a point above the glue-line, a vertically-reciprocating rod movable through said guideway and extending to a point above the same, means for reciprocating said rod, a horizontal glue-depositing head formed to move into the pot around said guideway, and a hanger from the upper end of said rod to said head, substantially as described.

27. In combination, a platform, a movable glue-pot provided with supporting-wheels on the platform, and removably held in its normal position, a vertically-reciprocating carrier, operating means therefor, and a glue-depositing head moved by the carrier into and out of the glue in said pot, substantially as described.

28. In combination, a platform, a glue-pot on the platform, a vertically-movable carrier extending from a point below the platform to a point above the glue-pot, a hanger depending from said carrier into said pot, a glue-depositing head carried by said hanger and moved vertically into and out of the glue-pot, means to maintain said carrier from the glue in said pot, and carrier-operating mechanism arranged below the platform, substantially as described.

29. In combination, means for maintaining a sheet at the glue-receiving position, a vertically-reciprocating glue-depositing head normally movable to and from said sheet-glue-receiving position, operating mechanism therefor, and manually-operated controlling means for varying the limit of upward movement of said head at any stroke thereof to a point below said glue-receiving position, substantially as described.

30. In combination, means for maintaining a sheet at the glue-receiving position, a glue-depositing head having a normal path of movement to and from said glue-receiving position, a carrier moving said head, operating means for moving said carrier comprising a lever, and manually-operated means for shifting the fulcrum-point of said lever to prevent said head moving to the glue-depositing position at any stroke, substantially as described.

31. In combination, a reciprocating glue-depositing head, and operating means therefor comprising an oscillating lever, means for oscillating said lever, said lever having a variable fulcrum, and means for shifting said fulcrum to shift the limits of movement of said head, substantially as described.

32. In combination, a reciprocating glue-depositing head, and operating means therefor comprising an oscillating lever, means for swinging said lever, and a cam forming the fulcrum-point of said lever, and provided with means for rocking the same to raise or lower the fulcrum-point of the lever and consequently raise and lower the limit of upward movement of said head, substantially as described.

33. In combination, a vertically-reciprocating glue-depositing head, and operating means therefor comprising a vertically-swinging lever forked at its rear end, an operating-cam having a cam-groove, a removable member having a stud confined in said groove, said lever rocking on and swung by said stud, a normally stationary cam in the forked end of said lever, and means for rocking said cam to raise and lower the forked end of the lever, substantially as described.

34. In combination, a movable platen adapted to present a sheet at the glue-receiving point, a glue-depositing head movable to and from the glue-receiving point, and operating means connected to move said platen and said head in sequence, substantially as described.

35. In combination, a rotary platen-head, a reciprocating glue-depositing head coöperating therewith, a driving member, intermittently-movable operating connections from said driving member to rotate said head step by step, and operative connections between said member and said glue-depositing head, to periodically reciprocate said head, substantially as described.

36. In combination, a platen-head having a series of platens, means to maintain sheets flatly against said platens with their outer faces exposed, means to move said platen-head step by step to successively bring said sheet to the glue-depositing position, periodically-movable means for distributing glue on said sheets at the glue-receiving position, and means for operating said glue-distributing means, substantially as described.

37. In combination, a platen provided with means to maintain a sheet flatly against the same throughout its surface by suction, and glue-depositing means for distributing glue on said sheet, substantially as described.

38. In combination, a platen-plate having a plurality of suction-openings and adapted to maintain a sheet thereon over said openings by suction, means for maintaining suction on said sheet and through said openings, and glue-depositing means, substantially as described.

39. In combination, a platen, means for maintaining a sheet on said platen by suction, mechanism for periodically applying and cutting off the suction from said platen, and glue-distributing means, substantially as described.

40. In combination, a movable platen-head provided with several platens adapted to receive sheets, means for applying and cutting off an air-exhausting device from communication with said platens periodically to hold the sheet to and release the same from said platens successively, and a glue-distributing device, substantially as described.

41. In combination, a platen having suction-openings therethrough, means to periodically throw said suction-openings into and out of suction communication with an air-exhausting device to hold a sheet to and permit the discharge from said platen, and a glue-distributing device adapted to deposit glue on the sheet while held to the platen, substantially as described.

42. In combination, a rotary platen-head having separate platen-plates provided with suction-openings, separate air-chambers within said head communicating with the suction-openings of said platen-plates respectively, an air-chest in communication with an air-exhausting device, means to throw said air-chambers into and out of suction communication with said air-chest as the platen-head rotates, and operating means, substantially as described.

43. In combination, a rotary platen-head having a series of flat perforated platen-plates, said head formed with separate internal air-chambers in open communication with the perforations of said platen-plates, respectively, each air-chamber having an end exhaust-port, an air-chest in communication with an air-exhausting device and held against rotation and having an inlet-port with which said exhaust-ports register as the head revolves, and having means to periodically close said exhaust-ports, operating means to rotate said head with a step-by-step movement, and means to periodically lock said head against rotation, substantially as described.

44. In combination, a rotary platen-head having a series of exterior platen-plates adapted to receive sheets and convey the same successively to the glue-receiving position, operating means to rotate the head with a step-by-step movement, means to periodically lock the head against rotation with a platen at the glue-receiving position, means to hold the sheet to the platen-plates when in glue-receiving position and to successively release the sheets from the plates as they pass beyond the glue-receiving position, and periodically-moving means to distribute glue on each sheet when in the glue-receiving position, substantially as described.

45. In combination, a shaft a platen-head fixed thereon and having an end hub and exterior perforated platen-plates, said head formed at one end with separate air-exhausting ports in open suction communication with said plates respectively, an air-chest mounted on said hub and held against rotation and in communication with an air-exhausting device and having an inlet-port to register periodically with said exhaust-ports and formed to periodically close certain of said exhaust-ports, means to rotate said shaft and head, and glue-distributing means, substantially as described.

46. In combination, a rotary shaft, a platen-head carried thereby and provided with exterior platens adapted to receive sheets and successively carry the same to the glue-receiving position, glue-depositing means adapted to successively distribute glue on said sheet at the glue-receiving position, a lock to hold said head against rotation with a platen at the glue-receiving position, operating means for periodically rotating said head and arranged to periodically release said lock, and an operating member operatively connected to actuate said glue-depositing means and said operating means, substantially as described.

47. In combination, means for maintaining the sheet at the glue-receiving position and removing the sheet therefrom, a glue-distributing device for depositing glue on a face of said sheet, and mechanism for sprinkling grit on the glue-face of the sheet, substantially as described.

48. In combination, a movable platen for presenting the sheet at the glue-receiving position and removing the same therefrom, means for discharging the glued sheet from the platen, conveying means receiving the sheet from the platen with its glued face up to receive the grit, and glue-distributing means, substantially as described.

49. In combination, a sheet-carrying platen, means to maintain a sheet on said platen with its under face exposed at the glue-depositing position, glue-distributing means having a glue conveying and depositing face of a fixed design to deposit glue over a sheet on said platen of the same design as the divided abrading-surface to be formed on the sheet, mechanism maintaining a body of liquid glue, said means movable into the glue with its face below the glue-line and upwardly therefrom to the glue-depositing position.

50. In combination, a movable platen, glue-depositing means, means to release each sheet from the platen at the sheet-discharging position, and a conveyer receiving each sheet discharged from the platen.

51. In combination, a platen, glue-depositing means, a conveyer receiving each sheet discharged from the platen, and means depositing each sheet onto the conveyer with its glued face up to receive the grit.

52. In combination, a movable platen, means for discharging the sheets therefrom, glue-distributing means, means for discharging a spray or shower of grit, and conveying means for receiving the glued sheets discharged from the conveyer and carrying the same through and exposing the glued faces thereof to said shower of grit.

53. In a machine for distributing glue on surfaces in the manufacture of abrading-surfaces, the combination of a platen arranged to hold the abrading-surface backing in a horizontal position with its bottom glue-receiving face exposed, a glue-depositing head, means for completely immersing the glue conveying and depositing portions of said head in liquid glue, and means for bringing said backing and head to the glue-depositing position above the glue-line, said platen formed to remove said backing from the glue-depositing position without disturbing the glue deposited on the face thereof.

54. In a machine for depositing glue on sheets in the manufacture of abrading-sheets, the combination of a platen formed to maintain a sheet at the glue-depositing position, a glue-depositing head formed to deposit glue on said sheet at a single stroke in the design of the abrading-surface to be formed thereon, and means for depositing grit on the glued face of said sheet, substantially as described.

55. In combination, means for maintaining a flexible sheet in a flat condition with its entire glue-receiving face exposed at the glue-receiving position and for removing the sheet from said position and reversing the same, a glue-depositing head having a divided glue-depositing face means for supplying glue to said face, and means for bringing said head and sheet together.

56. In combination, a sheet-carrying platen, means for removing the sheet from the glue-distributing position without contacting the glue-face of said sheet, and glue-depositing means formed to simultaneously deposit uniformly-distributed areas of liquid glue approximately over the entire face of the sheet with intervening blank or uncovered portions, a glue-supply, and actuating means.

57. In an apparatus for the manufacture of abrading-sheets, in combination, a movable sheet-carrying platen to maintain a flexible sheet in a flat even condition with one face exposed at the glue-distributing position and to remove the sheet therefrom, means to maintain a body of liquid glue, a glue-depositing head having a divided glue-distributing face all in one plane and in area approximately equal to the area of said exposed face of the sheet and normally located in said body of glue, and means for bringing said sheet and distributing-face together to simultaneously deposit areas of glue approximately over the entire face of the sheet with uniformly-disposed blank or uncovered portions of the sheet intervening between the areas of glue.

58. In an apparatus for making abrading-sheets, the combination of a platen, means for holding the sheet on said platen with its glue-receiving face exposed at the glue-distributing position and for releasing the sheet from said platen, glue-depositing means formed to simultaneously deposit the entire divided glue design throughout said face of the sheet, a glue-supply, and means for bringing said sheet and glue-depositing means together at the glue-distributing position.

59. In an apparatus for making abrading-sheets, in combination, movable devices for maintaining a sheet at the glue-distributing position and for removing and reversing the sheet, and glue-depositing mechanism for distributing the entire glue design on the face of said sheet at the glue-depositing position.

60. In an apparatus for making abrading-sheets, in combination, means for maintaining a sheet in a flat condition with its glue-receiving face entirely exposed at the glue-depositing position, glue-distributing means having a divided glue-depositing face in one plane with said face of the sheet and in area approximately equal to the area of said face of the sheet, means for supplying liquid glue to said divided depositing-face, and mechanism for bringing said face and the sheet together, whereby the entire divided glue design of a complete abrading-surface is simultaneously and at one movement deposited over the sheet.

61. In an apparatus for making abrading-sheets, in combination, means for maintaining a sheet with one face exposed at the glue-depositing position and for removing the sheet without contacting its glue-face, glue-distributing means having a divided glue-depositing face approximately of the size of said face of the sheet and of the design of a complete divided or clearance space abrading-surface, a glue-supply, and mechanism for bringing the sheet and said face together, whereby the entire divided glue design is instantaneously deposited on the sheet.

62. In combination, means for moving a sheet to, maintaining the sheet at and removing the same from the glue-depositing position comprising a suction device, a glue-depositing device, and means to bring said device and the sheet together at the glue-depositing position.

63. In combination, a platen, a suction device for maintaining a sheet thereon and releasing the same therefrom, a glue-distributing device having a divided glue-depositing face of the design of a complete abrading-surface, and means for bringing said sheet and said face together.

64. In an apparatus for making divided abrading-surface sheets, the combination of sheet-carrying means for presenting the sheet at the glue-depositing position, and removing the same therefrom, means for presenting the sheet with its glue-face exposed to receive the grit, and a glue-distributing device having a divided glue-depositing face to distribute the glue on said sheet in the design of a complete divided abrading-surface.

65. In an apparatus for making abrading-sheets, the combination of mechanism for presenting a sheet at and removing the same from the glue-depositing position comprising a pneumatic device for holding and releasing the sheet, means for receiving the sheet from said mechanism with the glue-face of the sheet exposed, a glue-distributing member having a divided glue-depositing face, and actuating means operating said mechanism and member in sequence.

66. In an apparatus for making divided-surface abrading-sheets, the combination of a movable sheet-carrying platen, a head having a divided glue-depositing face of the design of a complete clearance-space abrading-surface, means maintaining a body of liquid glue below the glue-line of which said head immerses, and means to bring said face and sheet together to instantaneously deposit the complete glue design over the surface of the sheet.

67. In an apparatus for making clearance-space abrading-sheets, the combination of a platen, means for maintaining a single sheet thereon with its face entirely exposed, means for maintaining a body of liquid glue, a single glue-distributer having a glue-depositing face of the design of a complete clearance-space abrading-surface, operating means for immersing said distributer in said glue and for bringing said sheet and said glue-depositing face together, whereby the entire glue design for a complete abrading-surface is simultaneously deposited on the sheet, and means for delivering said sheet with its glue-face uppermost to receive the grit.

68. In an apparatus for making clearance-space abrading-surfaces, the combination of means for supporting a sheet at the glue-receiving position comprising a pneumatic device for holding and releasing the sheet, a glue-distributing member having a glue-depositing face of the design of a complete clearance-space abrading-surface, means for supplying liquid glue to said face, and operating means for bringing said sheet and face together for instantaneously depositing on the sheet the complete glue design of a clearance-space abrading-surface, to receive the grit.

69. In an apparatus for making clearance-space abrading-surfaces, the combination of a movable sheet-carrying platen, means for maintaining a sheet thereon at the glue-receiving position, and mechanism for simultaneously depositing on said sheet the entire predetermined divided design in glue of a complete clearance-space abrading-surface, whereby the abrading-surface is produced by sprinkling the grit on the complete divided glue design thus deposited on the sheet.

70. In an apparatus for making clearance-space abrading-surfaces, the combination of means to successively convey the sheets to and present the same at the glue-depositing position and to remove the sheets from said position and present the glue-faces thereof at the grit-receiving position, a glue-distributing head having a divided glue-depositing face of the design of a complete abrading-surface, means to supply glue to said face, and operating devices, substantially as described.

71. In a machine for depositing glue over the surfaces of sheets in the manufacture of abrading-sheets, a glue-depositing head having its entire divided upper face formed by uniformly-disposed areas of glue conveying and depositing edges arranged in a fixed design to simultaneously deposit the glue over approximately the entire glue-receiving face of a sheet in the predetermined design of the divided abrading-surface to be formed thereon, in combination with means to present a sheet to said face and to remove the sheet and present its glue-face at the grit-receiving position without contacting the glue-face, substantially as described.

In testimony whereof I affix my signature in presence of witnesses.

GEORGE GORTON.

Witnesses:
 MAUDE M. MORRIS,
 C. B. CARPENTER,
 H. J. HERZOG,
 JULIA BENNISH.